CENTRALLY POWERED SUBSCRIBER CARRIER SYSTEMS

Filed May 19, 1966 2 Sheets-Sheet 1

INVENTOR
CARL A. EBHARDT

BY Phillip A. Weiss
ATTORNEY

Aug. 5, 1969 C. A. EBHARDT 3,459,895

CENTRALLY POWERED SUBSCRIBER CARRIER SYSTEMS

Filed May 19, 1966 2 Sheets-Sheet 2

United States Patent Office 3,459,895

Patented Aug. 5, 1969

3,459,895

CENTRALLY POWERED SUBSCRIBER CARRIER SYSTEMS

Carl A. Ebhardt, Raleigh, N.C., assignor to International Telephone and Telegraph Corporation Filed May 19, 1966, Ser. No. 551,332
Int. Cl. H04h 1/08
U.S. Cl. 179—2.5 10 Claims

ABSTRACT OF THE DISCLOSURE

A D.C. power transfer system is used in a subscriber carrier system. The subscriber set is isolated from high D.C. voltages present on the carrier line. A D.C. to D.C. converter is used to supply subscriber power.

This invention relates to carrier systems and more particularly to subscriber carrier systems.

Carrier systems are well known in telephony. For the most part, carrier systems have been used for interconnecting central offices. Recently, carrier systems have begun to be used more extensively for linking subscribers to the central offices. Such use of carrier systems offers substantial savings to the telephone companies, especially in the present environment, wherein comparatively few subscribers want party lines. Without the use of subscriber carrier systems, a separate telephone line has to be used to connect each subscriber to the central office. By using carrier methods one telephone line can service a plurality of subscriber stations even when the stations are not on party lines.

One of the difficulties encountered in providing subscriber carrier service is in the power feed used to supply the subscriber set with D.C. power. In carrier systems, power feed voltages in the order of 100 to 300 volts to ground are used. The relatively high voltages are required since the operating voltages at each repeater or terminal is usually in the order of 10 to 30 volts, D.C. The units are connected to be series current fed from the central office; thus, approximately ten repeaters or terminals can be supplied per cable pair. In the case of carrier systems used to interconnect central offices (trunk carrier), the high voltages are tolerable since they are accessible only to persons trained to take proper precautions, such as the telephone company installers and repair men.

Such relatively high voltages, however, could prove fatal if available at subscriber stations.

Since it is necessary to supply D.C. loop current to the subscriber set, one possible method of providing D.C. loop current to the subscriber station in a subscriber carrier system is to provide each subscriber set with a local power source, such as could be made available at the subscribers house. This method is undesirable because, among other things, it is the policy of telephone operating companies to assure the customer of telephone service even in times of disaster or in the event of power failure.

An alternative method of safely supplying D.C. loop current to a subscriber station in a subscriber carrier system is to transmit stepped up alternating voltage from the central office and to step it down by transformer at the subscriber terminal before rectifying it to provide the usual D.C. loop current. Transmitting A.C. power, however, generally leads to cross-coupling between the A.C. power and the communication channels which results in the appearance of noise (hum) in the speech channels.

Accordingly, an object of this invention is to provide central office originated power feed for subscriber carrier systems; which power feed does not present a "shock" hazard to users and does not introduce extraneous noises.

Another object of this invention is to provide power feed in subscriber carrier wherein there is complete D.C. isolation between the D.C. power of the subscriber drop and the D.C. power fed from the central office.

A related object of this invention is to furnish compatible subscriber signalling means while maintaining the noted complete D.C. isolation.

In accordance with one preferred embodiment of the invention, a D.C. to D.C. converter is used to isolate the subscriber drop from the D.C. power received from the power source of the central office. The series D.C. current received from the central office is used to drive a multivibrator. The output of the multivibrator is transferred through a D.C. isolating transformer to a rectifier. After rectification the D.C. current is fed to the subscriber station through the drop. The D.C. isolation of the drop is completed through the use of ring amplifier and ring detector circuits that do not couple the D.C. power received from the central office to the subscriber station.

The above mentioned and other objects and features of this invention and the manner of obtaining them will become more apparent and the invention itself will be best understood by reference to the following description of an embodiment of the invention taken in conjunction with the accompanying drawings, in which.

Figure 1:
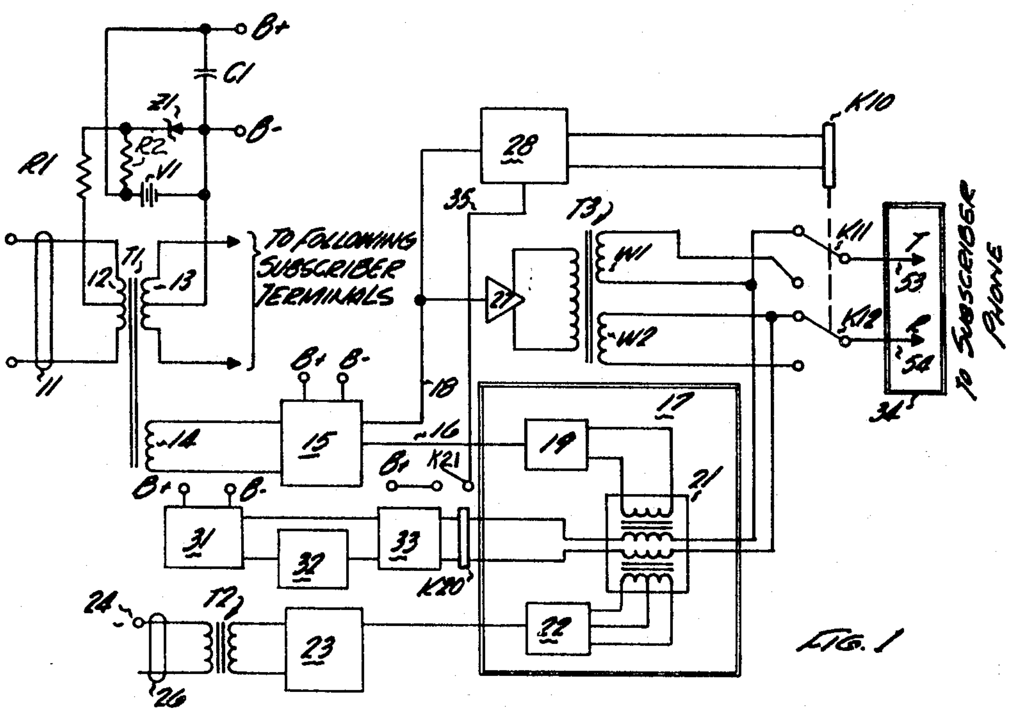
FIG. 1 is a block diagram showing of the main portions of a subscriber's terminal in the inventive subscriber carrier system.

The power feed circuitry servicing a subscriber in a subscriber carrier system is shown in FIG. 1. As shown therein, the incoming cable 11 from the central office is connected to the primary winding 12 of a transformer T1. One winding 13 of the secondary of transformer T1 is coupled to the following subscriber terminals. Another winding 14 of transformer T1 is connected to the receiver 15 of the subscriber terminal of FIG. 1.

The direct current power used at the subscriber terminals, in accordance with this invention, is received from the central office, just as is the D.C. power used in trunk carrier terminals. As in the trunk carrier systems, the subscriber terminal units are series fed from the central office. The repeater or terminal taps off 10 to 30 volts to obtain operating power.

At the central office a positive D.C. voltage in the order of 120 volts is applied at the center tap of the secondary winding of the transmitting transformer. At each repeater or station terminal, means are provided for tapping the transmitted D.C. power to obtain operating power. In greater detail, means, such as resistors R1, R2 in series, are connected between the mid-point of winding 12 and the B+ terminal tap. The B− terminal tap is coupled directly to the midpoint of winding 13. A battery V1 is connected between the midpoint winding 13 and the B− tap. The battery is used to supplement the power received from the central office when there are large current drains, such as when ring current is supplied. The battery V1 is protected from lightning surges by Zener diode Z1.

The actual power used is taken through the dropping resistor R2 connected in series with Zener diode Z1 between the B1 terminal and the B− terminal. A decoupling capacitor, such as capacitor C1 is connected across the B+, B− terminals to minimize ripple.

All power operated units, such as the receiver 15, are connected to the power source at its B+, B− terminals. It should be understood that while there are 10 to 30 volts D.C. voltage between the B+, B− terminals, the terminals are approximately 120 volts above ground potential.

The receiver 15 receives both voice communication and ringing signals. The voice communication signals are transmitted over conductor 16 to compandor 17 and the ringing signals are transmitted through conductor 18 to the subscriber signalling circuits.

The compandor 17 comprises circuitry such as the well known expandor 19 and compressor 22, both coupled to hybrid 21.

The compressor 22 is connected to the subscriber terminal transmitter 23 which is, in turn, coupled to the cable returning to the central office through transformer T2. The transformer T2 windings may be at −120 volts D.C. with respect to ground, as indicated by the negative signal above the terminal 24 connected to the cable 26 leading back to the central office. The signalling circuits fed by conductor 18 comprise ringing amplifier 27 and ring detector 28.

Means are provided for D.C. isolating the signalling circuits from the subscriber station. For example, the output of the ring detector operates ring relay K10. The contacts of the ring relay K10 are connected to the subscriber station but not to the power circuits of the terminal. The coil of relay K10 is connected to the central office power but not to the subscriber station. Thus, the detector circuit 28 is isolated from the subscriber station. The ring amplifier 27 is coupled to contacts K11, K12 on the ring relay K10 through transformer T3. The transformer, of course, acts to D.C. isolate the ring amplifier from the subscriber station. The output of the hybrid 21 which carries the voice signals is D.C. isolated from the expandor and compressor circuits. The output of hybrid 21 is connected to contacts K11, K12 of relay K10. The contacts connect the signals on the hybrid output through the subscriber drop to the subscriber station.

Means, such as D.C. to D.C. converter 31, are provided for supplying the subscriber with D.C. power without exposing the subscriber to the high D.C. voltage to ground. The isolation between the high voltage D.C. and the subscriber station provided by the converter 31 is complemented by the design of the signalling circuits. The output of converter 31 is coupled through a current limiter 32, choke 33, loop dial relay K20, hybrid 21, contacts K11, K12 and the subscriber drop 34 to the subscriber station loop.

Thus, FIG. 1 shows an embodiment of a subscriber terminal in the inventive subscriber carrier system. As shown therein, the terminal station receives power and signals from a central office over incoming cable 11 coupled to the primary winding 12 of transformer T1. One secondary winding 13 of transformer T1 is connected to subsequent subscriber terminals similar to the terminal of FIG. 1.

The carrier signals, including ringing and communication signals, transmitted to the subscriber carrier terminal station of FIG. 1 are received and demodulated, in the well known manner at receiver 15 coupled to the carrier cable 11 through secondary winding 14 of transformer 13. The ring signals are separated from the voice communication signals in any well known manner. The ringing signals are directed to the signalling circuits through conductor 18 while the voice communication signals are directed to the well known compandor circuits through conductor 16. At this point, the signals are not necessarily isolated from D.C. power source and hence, could be at 120 volts D.C. above ground.

The voice communication signals, however, in the compandor pass through the expandor 19 and are transformer coupled in the hybrid 21 to the leads going to the subscriber drop through relay contacts K11, K12. Thus, the voice communication signals going from the expandor to the hybrid output coils are isolated from high voltage D.C. power if the hybrid output coils are properly isolated.

In trunk carrier systems the D.C. power for the repeater is coupled from the B+, B− terminals through the hybrid circuit. If that practice were followed in subscriber carrier systems, the subscriber would be subject to high voltage D.C. shocks. Thus, means, such as the D.C. to D.C. converter 31 are used to isolate the subscriber station from the high voltage. The D.C. to D.C. converter converts the D.C. power which is at approximately 120 volts above ground to power that is in the order of 10–30 volts above ground. The output of the D.C. to D.C. converter passes through an amplitude limiter 32 which ascertains that the amplitudes of the converter do not exceed some predetermined values. The output of the limiter goes through the familiar subscriber loop circuit choke 33 and the loop dial relay K20 to the hybrid 21.

From the hybrid 21 D.C. power goes through relay contacts K11, K12, the subscriber drop 34 to the subscriber station.

At the station this D.C. power is used, among other things, to monitor the subscriber loop and to thus control the subscriber signalling. The control of the subscriber signalling is indicated by the lead 35 and contact K21 shown in FIG. 1 leading from the ring detector circuit.

Thus, if the subscriber at the station served by the terminal of FIG. 1 is off-hook the loop-relay K20 is operated. The contacts of K21 close to block the energization of the ring relay. If the subscriber station is idle, then ring relay K10 operates when the ringing signals are detected.

The ringing signals are amplified by the amplifier 27 and transmitted to the subscriber drop 34 through ring transformer T3 and relay contacts K11, K12 operated. The ring transformer prevents any D.C. used in the amplifier bias circuits from being transmitted to the subscriber station.

The transmitter 23 and associated circuitry are D.C. insulated from the subscriber station by the hybrid just as the receiver is so isolated. Thus, the subscriber is afforded D.C. loop current, signalling power and communication signals, without any subscriber exposure to high voltage D.C. It should also be noted that the system is effectively insulated from any inadvertent shorts at the subscriber station.

Figure 2:
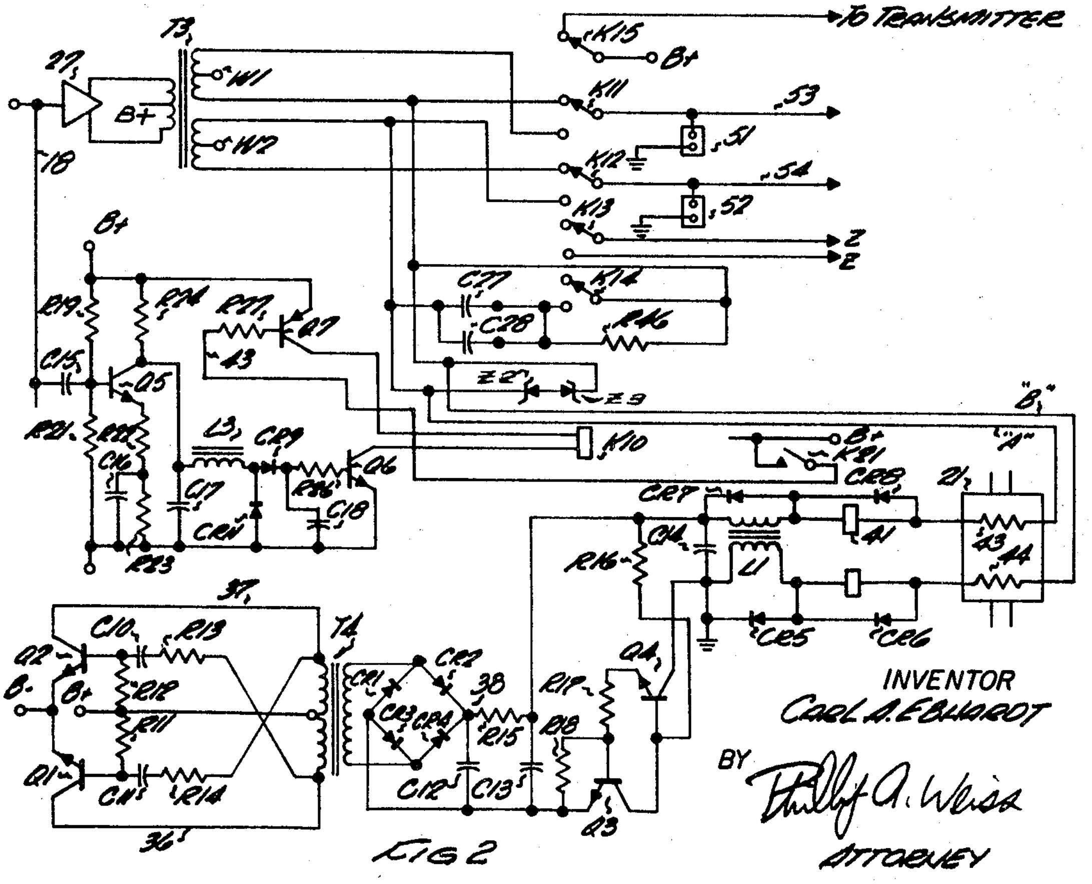
FIG. 2 is a schematic showing of the signalling and ringing portion of the carrier subscriber terminal shown in FIG. 1.
Figure 3:
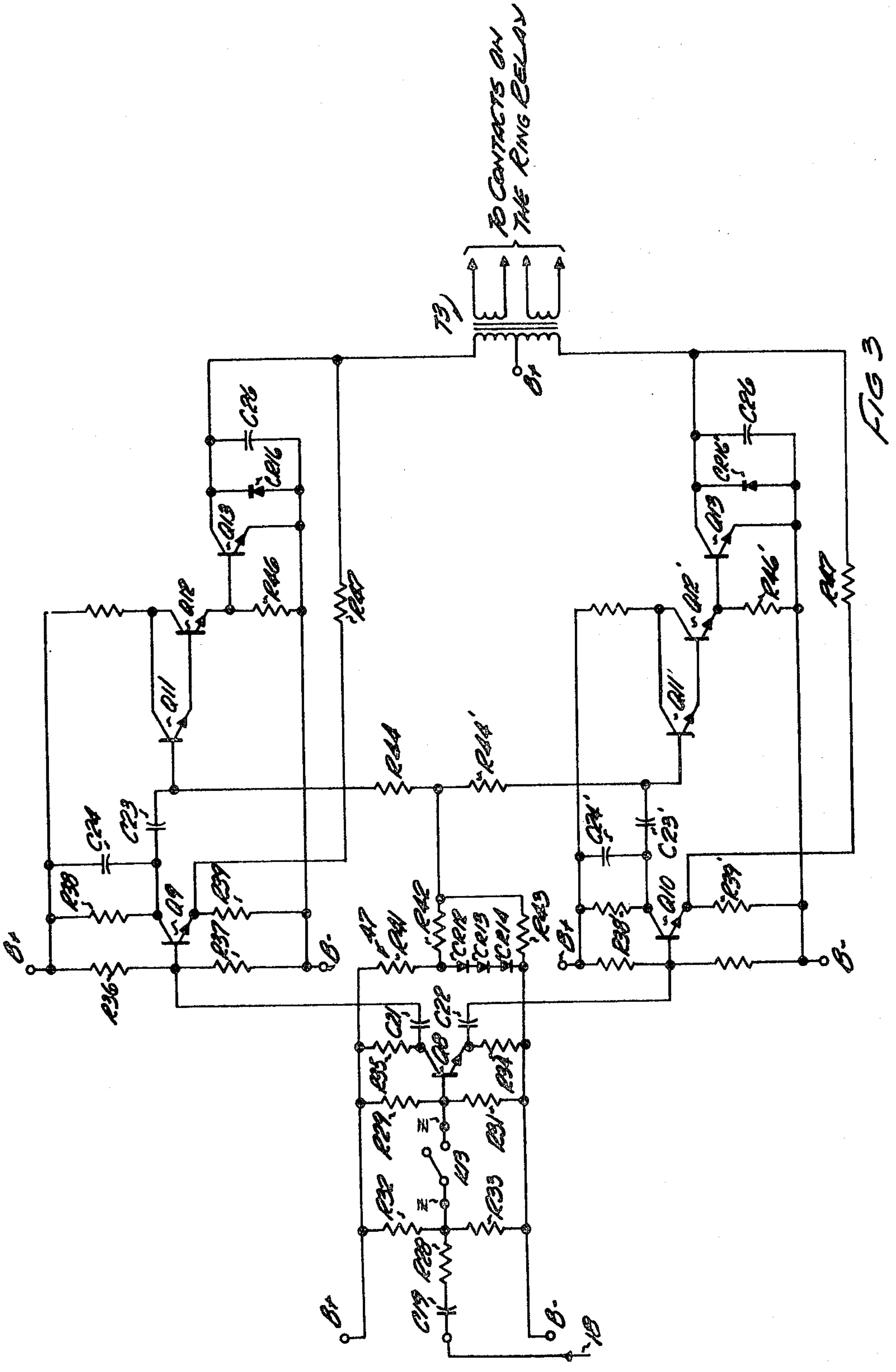
FIG. 3 is a schematic showing of the ringing amplifier shown in block diagram form in both FIGS. 1 and 2.

Details of the D.C. isolation provided by the power feed system and the signalling system of the FIG. 1 block diagram are shown in the schematic diagrams of FIGS. 2 and 3. The power feed system, of course, provides D.C. loop current while the signalling system provides subscriber signalling.

The D.C. isolation of the power feed system will be considered first. The D.C. to D.C. converter 31 comprises a multi-vibrator circuit energized by the B+ and B− power supply terminals. More specifically, the multivibrator uses two NPN transistors Q1, Q2. The emitters of both transistors are connected to the B− terminal. The bases of transistor Q1, Q2 are connected to the B+ terminal through resistors R11, R12 respectively.

Means, such as transformer T4, is provided to D.C. isolate the multivibrator output. More specifically, the collectors of transistors Q1, Q2 are connected to opposite ends of the primary winding of an output transformer T4 through conductors 36, 37 respectively. The normal multivibrator feedback paths exist which link the collector of transistor Q1 to the base transistor Q2 and the collector of transistor Q2 to the base of transistor Q1. In greater detail, the collector of transistor Q1 is connected to the base of transistor Q2 through dropping resistor R13, and capacitor C10 in series. Similarly, the collector of transistor Q2 is coupled to the base of transistor Q1 through dropping or limiting resistor R14 and capacitor C11 in series.

The center tap of the primary of transformer T3 is connected to B+. Thus, the collectors of transistors Q1, Q2 are biased through the bottom and top portion of the primary winding of transformer T4 respectively.

The secondary of transformer T4 which is D.C. isolated from the primary, is connected to a rectifying diode bridge, comprising four rectifiers CR1–CR4. The D.C. output of the bridge is filtered by capacitor C12 connected across the output terminals of the bridge, series resistor R15, connected between one output terminal 38 of the bridge and capacitor C13 which is connected to the other output terminal 39 of the bridge.

The junction point of resistor R15 and filter capacitor C13 is connected to the choke L1. This choke is the well known choke normally in series with the A or "ring" lead of the subscriber loop circuit. The common point of capacitors C12, C13 is connected to the choke L2 through a loop current limiter. This is the well known choke normally found in the $\beta$ or "tip" lead of the subscriber loop circuit.

The loop current limiter circuit comprises a pair of NPN transistors Q3, Q4. The junction point of capacitors C12, C13 is connected to the emitter of transistor Q3. The collector of transistor Q3 is connected to the base of transistor Q4 and through resistor R16 to the junction of conductor 39 and choke L1.

The collector of transistor Q4 is connected to choke L2. The collector of transistor Q4 is also coupled to conductor 39 through ripple filter capacitor C14. This capacitor prevents ripple generated in the converter from passing through the hybrid the subscriber set. The emitter of transistor Q4 is connected through resistor R17 to the base of transistor Q3. The junction of resistor R17 and the base of transistor Q3 is connected to the emitter of transistor Q3 through resistor R18.

The D.C. output of the limiter and the output on lead 39 thus pass through the ring and tip (A and B) lead chokes L1, L2 to respective windings 41, 42 of the loop dial relay K20, windings 43, 44 on the hybrid coil, the A, B lead going to the subscriber drop. Transient suppressing means, such as diodes CR5–CR8 may bridge the coils of the inductors L1, L2 and the relay K20 to preclude any adverse effects of the dial pulses.

The A, B leads are connected to the subscriber A, B, leads through contacts on the ring relay K10.

The A, B leads are provided with lightning protection means such as unitrode diodes Z2, Z3 connected across the A, B leads.

The loop circuit is, of course, completed at the subscriber station (not shown) when the telephone set there goes off-hook. The completion of the loop at the subscriber station draws current through the loop dial relay windings 41, 42 causing that relay to operate. The operation of the relay K20 closes contacts K21 which blocks the operation of the relay K10.

In greater detail, the relay K10 is operated under the control of the A.C. ringing voltage detector circuitry. The ringing signal is directed over lead 18 to the detector circuitry where it passes through coupling capacitor C15 to the base of NPN transistor Q5. The base is biased by connection to a voltage dvider, made up of resistors R19, R21 which are connected in series from B+ to B—. The emitter of transistor Q5 is connected to B— battery through the series combination of resistors R22, R23. Resistor R23 is bridged by feedback capacitor C16. The collector of transistor Q5 is connected to the B+ battery through resistor R24.

A low pass "L" type filter serves as the load for the transistor Q5. The filter comprises capacitor C17 and inductor L3. The capacitor C17 is connected between the collector of transistor Q5 and B— battery supply. The inductor L3 is also connected at one end, to the collector of transistor Q5. The output of the filter, the other end of inductor L3 is connected to a full wave rectifier.

In greater detail, the other end of the inductor L3 is connected to a pair of diodes CR9, CR11 and more specifically to the anode of diode CR9 and to the cathode of diode CR11. The cathode of diode CR9 is coupled to the base of a switching transistor Q6 through coupling resistor R26. Filter capacitor C18 is connected from the junction of diode CR5 and resistor R26 to the B— bus.

The emitter of the NPN transistor Q6 is coupled directly to the B— bus. The collector of the NPN transistor is coupled to one side of the winding of the ring relay K10.

Means are provided for inhibiting the operation of relay K10. More specifically, the other side of the winding of relay K10 is connected to the collector of a PNP switching transistor Q7. The emitter of transistor Q7 is connected directly to the B+ battery terminal. The base of transistor Q7 is connected to the B+ battery through coupling resistor R27, conductor 43 and normally open contacts K21 on the loop dial relay K20. Thus, positive battery inhibits the transistor Q2 and prevents the operation of the ring relay when the subscriber loop is complete.

Thus, if the ring signals are present on conductor 18 and the subscriber loop is idle ring relay K10 operates to enable the signals on conductor 18 to alert the subscriber. As best seen in FIG. 3, the ring amplifier receives signals over lead 18.

Means are provided for enabling the ring amplifier under the control of the ring detector circuitry. More specifically, the input signal on conductor 18 passes through coupling capacitor C19, coupling resistor R28, normally open contacts K13 on relay K10 to the base of transistor C8, in a phase inverting stage on the ring amplifier.

The base of transistor Q8 is biased through its connection to the junction of resistors R29, R31 which are series connected from the B+ battery bus to the B— battery bus on the base side of contacts K13.

Resistors R3, R33 are connected in series from the B+ battery bus to the B— battery bus on the lead 18 side of the contacts K13. These resistors serve to stabilize the load on the battery supply such that it is independent of the open or closed condition of contacts K13.

The emitter of transistor Q8 is coupled to the B— supply through bias and load resistor R34. The collector of transistor Q8 is connected to the B+ supply through load resistor R35.

The transistor Q8 serves as an inverter stage for providing signals with opposite pulses to succeeding push-pull stages. Thus, the collector of transistor Q8 is coupled to the base of an NPN transistor Q9 through capacitor C21. The emitter of transistor Q8 is similarly coupled to the base of an NPN transistor Q8 through coupling capacitor C22.

Both transistors Q9 and Q10 serve as signal amplifiers feeding Darlington amplifiers of a push-pull output stage. In greater detail, the base of transistor Q9 is biased through the connection of the base to the voltage divider network comprising resistors R36, R37 connected in series from B+ to B— battery.

Since the circuitry related to transistor Q10 is similar to that of transistor Q9, it will not be described, but the like components will be indicated by the same designation numbers and/or symbols primed.

The output of the inverter stage transistors Q9, Q10 are coupled to the output transformer T3 through push-pull output amplifiers arranged as Darlington amplifier circuits. More particularly, the collector of the transistor Q9 is coupled through coupling capacitor C23 to the base of a first transistor Q11 of a Darlington amplifier comprising transistors Q11, Q12 and Q13.

The collector of transistor Q9 is connected to B+ battery through load resistor R38. Resistor R38 may be bridged by high-frequency roll off capacitor C24. The emitter bias of transistor Q9 is obtained through resistor R37.

In the Darlington amplifier circuit, the collectors of transistors Q10, Q11 are commonly connected to B+ battery through resistor R39.

Base bias for transistor Q11 is obtained through a temperature compensating network. In greater detail, a temperature compensating network is provided which comprises a voltage divider 47 made up of resistor R41 in series with a chain of three silicon diodes CR12, CR13 and CR14. The voltage divider 47 is connected between B+ and B− batteries. The silicon diode characteristics vary with temperature to change the transistor base bias and consequently compensate for variation in the transistor characteristics caused by temperature change. A further voltage divider 48 comprising resistors R42, R43, in series, is connected across the diode chain. The bases of transistors Q11, Q11′ are coupled to the junction point of resistors R42, R43 through resistors R44, R44′ respectively.

The emitter of transistor Q11 is coupled directly to the base of transistor Q12. The emitter of transistor Q12 at its junction with the emitter load resistor R46 is conneced to the base of transistor Q13. The other end of resistor R46 is connected to B− battery.

The emitter of transistor Q13 is coupled directly to the B− battery. The collector of transistor Q13 is coupled to positive battery through the top portion of the primary winding of transformer T3. The emitter of the transistor Q13 is connected to the collector of the same transistor through a diode CR16 bridged by a capacitor C26. The diode CR16 acts as a lightning protector and the capacitor C26 is used for high frequency filtering.

Means are provided for assuring that the ringing signal output of the push-pull amplifier is linear. In greater detail, negative feedback is provided through resistor R47 connected between the output of the push-pull amplifier at the collector of transistor Q13 and the emitter of the first stage of the push-pull amplifier transistor Q9.

As best seen in FIGS. 1 and 2, the D.C. isolated secondary windings of transformer T3 are coupled to the subscriber station through contacts K11, K12 on ring relay K10. Contacts K13 which are shown connecting point ZZ close only when ring signal is detected is used to preclude undue power drain via communication circuit. The points ZZ appears in the base circuit of transistor Q8 of FIG. 3. Thus, unless ring signal is detected and contacts K13 closed the ring amplifier does not pass any signal.

Means are provided for transmitting ring signals to the subscriber. In greater detail, when relay K10 operates contacts K14 close to couple together the secondary windings W1, W2 of transformer T3. When contacts K14 close, capacitors C27, C28 which present very low impedance to ring frequency are parallel connected in series between winding W1 and winding W2 of transformer T2.

Means are provided for controlling the transient pulse generated when the capacitors C27, C28 are initially inserted into the circuit. The transient control is accomplished by use of resistor R46 across contact K1r.

Another set of contacts K15 on the ring relay K10 acts to remove B+ from the transmitter during the receipt of ring signals.

Lightning protection may be further provided at the terminal. For example, carbon block lightning arrestors 51, 52 may be installed between the drop lines 53, 54 and ground.

In operation, the subscriber carrier system equipment at the terminal assures the usual subscriber signalling power while maintaining the power transmitted to the subscriber at levels that are much too low to harm or be unsafe in any way.

The D.C. power required by the subscriber is generated by the D.C. to D.C. converter 31. The converter comprises a transistorized bistable oscillator having transistors Q1, Q2. When transistor Q1 conducts, transistor Q2 is blocked through the crosscoupling of the feedback path comprising the resistor and capacitor such as R13, C10.

When C10 is charged, however, the drop across base bias resistor R12 is diminished to the point where transistor Q2 is unblocked. This, in turn, creates blocking bias for transistor Q1 across resistor R11.

The bistable oscillator's output appears across transformer T4. The alternating current output is rectified by the bridge rectifier attached to the secondary of the transformer T4. Note that the secondary of transformer T4 is isolated from the D.C. of the primary side of the transformer. The rectified output is filtered by capacitors C12, C13 and passed through a transistorized loop current limiting circuit comprising transistor Q3, Q4. The loop current limiting circuit is designed to compensate for differences in the distances from the subscriber terminal at the pole to the subscriber station in the subscriber's home.

The loop current normally flows through transistor Q4. The impedance presented to the flow of the current by transistor Q4 is an inverse function of the amount of current flowing in the loop. Thus, if the current in the loop increases the current flow through resistors R17, R18 increases. As the drop across resistor R18 increases the base of transistor Q3 is made less negative, enabling more current to flow therethrough. More current flowing through transistor Q3 causes the base of transistor Q4 to become more negative thereby reducing the current flow through transistor Q4. Thus, the loop current is held within limits as defined by the operation of the loop current limiter.

A supervisory circuit extends through the coils L1, and the upper winding 41 of the loop dial relay K20, hybrid coil 43, conductor A, normally closed contact K12 to the subscriber station loop. When the handset at the subscriber station is on-hook, the loop is open and no current flows. When the handset is off-hook, current flows through the well known subscriber's circuit and back through the tip conductor 53, contacts K11, conductor 53, hybrid coil 44, the lower winding 42 of relay K20 to the output of the current limiter.

Responsive to the current flowing in its windings, relay K20 operates to close the normally open contacts K21. The contacts K21 in a closed condition prevent the operation of the ring detect circuit by completing a path from the B+ battery supply through resistor R27 to the base of transistor Q6 to block that transistor. As long as transistor Q6 is blocked the operation of relay K10 is prevented.

When the central office sends ring signal to the subscriber it is picked up by the receiver 15 and transmitted over conductor 18 to the ring amplifier 27 and ring detector 28. The ring detector is inhibited from operating if the subscriber line loop is complete (off-hook condition). If the subscriber handset is on hook the transistor Q6 conducts to complete the ring relay K10 to operate circuit.

Transistor Q5 conducts responsive to the receipt of ring signals over conductor 18. The amplified ring signal output of transistor Q5 passed through the low pass filter, comprised of inductor L3 and capacitor C17. The low pass filter output is rectified and used to switch transistor Q7. When both transistors Q6, Q7 conduct, the ring relay K10 operates.

The operation of relay K10 enables the ring amplifier 27 circuit. More particularly, contacts K13 close to complete a path from conductor 18 to the base of inverter transistor Q8. As an aid in the regulation of the battery voltage, and to eliminate transients which would otherwise be caused by the closing of contacts K13 to complete a circuit draining capacitor C19; the current flow upsetting the bias on transistor Q8, a voltage divider circuit is provided on both sides of contacts K13.

The outputs of the inverter transistor Q8 go through the push-pull amplifier comprising transistor Q9, Q10, Q11 and Q12 and Q9′, Q10′, Q11′ and Q12′.

With the ring detector relay K10 operated, the output of ring amplifier goes through transformer T3 with secondary windings thereof W1, W2 connected in series, through contact K14 and capacitors C27, C28 in parallel. Thus, the top of winding W1 and the bottom of winding W2 are coupled to the subscriber loop leads T, R through contacts K12, K11 respectively. The ring current then operates the subscriber signalling device. Responsive thereto the subscriber if at home, removes the handset from the hookswitch.

The removal of the handset from the hookswitch causes the line loop relay K20 to operate. The operation of relay K20 inhibits the ring detector output and thus causes relay K10 to return to normal. Responsive thereto the ring amplifier is disconnected from conductor 18, the series connection of windings W1, W2 of transformer T2 is removed. Instead, the leads A, B are coupled to the leads T', R' through the contacts of relay K10 in the normally unoperated condition. The subscriber loop circuit is thus placed in condition to receive and transmit intelligence without there being any high voltage D.C. at the subscriber station.

While the principles of the invention have been described above in connection with specific apparatus and applications, it is to be understood that this description is made only by way of example and not as a limitation on the scope of the invention.

I claim:

1. A subscriber carrier system for connecting individual subscriber stations to a central office through channels carrying D.C. power, ring and communication signals, terminal means connected between said subscriber stations and said central office, said terminal means comprising means for tapping said channels to intercept a portion of said power, ring and communication signals, processing means coupled to said tapping means for processing said ring and communication signals, and sending them to said subscriber stations while D.C. isolating said subscriber station from said terminal means, and power feed means coupled to said tapping means for transmitting said power signals received from said channel to said subscriber station for use as loop power, while D.C. isolating said subscriber station from said terminal means.

2. The subscriber carrier system of claim 1 wherein said power feed means comprises D.C. to D.C. converter means.

3. The subscriber carrier system of claim 2 wherein said tapping means comprises channel transformer means, primary winding means on said channel transformer means coupled to said central office through one of said channels, a first secondary winding on said transformer coupling said primary winding to continue said one channel, D.C. coupling means between said primary winding and said first secondary winding for extending D.C. power signals through said one channel, and said D.C. coupling means including series resistance means for diverting a portion of said D.C. power signals to said power feed means, and second secondary winding means on said transformer means for diverting a portion of said ring and communication signals to said processing means.

4. The subscriber carrier system of claim 3 wherein D.C. to D.C. converter means comprises bistable oscillator means operated to oscillate responsive to D.C. power signals received from said D.C. diverting resistance means, converter transformer means connected to said oscillator means for D.C. isolating said D.C. power signals received through said one channel from said subscriber station, rectifying means for rectifying the output at said converter transformer means to provide D.C. power for said subscriber station, filter means coupled to said rectifying means for ripple filtering the output of said rectifying means, current limiting means connected to the output of said filter means for preventing said rectified output current from exceeding a certain maximum level, and coupling means for coupling said isolated, limited direct current to said subscriber station for use as subscriber loop power.

5. The subscriber carrier system of claim 4 wherein said coupling means includes hybrid means, and ring relay contact means for coupling said hybrid means to said subscriber station.

6. The subscriber carrier system of claim 5 and supervising means coupled between said converter means and said hybrid means for supervising the loop in said subscriber station.

7. The subscriber carrier system of claim 6 wherein said processing means comprises receiver means coupled to the second secondary winding, said receiver means having a communication signal output and a ring signal output, expander means for coupling said communication signal from said receiver means to said hybrid means, and receiving windings on said hybrid means D.C. isolating said communication signal received through said receiver means from said subscriber station.

8. The subscriber carrier system of claim 7 wherein said ring signal output is coupled in parallel to ring detect means and to ring amplifier means, said ring detect means operated to control said ring relay means to operate responsive to the receipt of ring signal while the subscriber loop is open, and ring transformer means connected to said ring amplifier means for coupling said ring signals to contacts on said ring relay and for D.C. isolating said ring signals received through said ring amplifier from said subscriber station.

9. The subscriber carrier system of claim 8 wherein contacts on said ring relay enable said ring amplifier, and wherein said supervising means comprises loop relay means and contacts on said loop relay for enabling said ring detect means.

10. The subscriber carrier system of claim 3 wherein said D.C. coupling means includes battery means for supplying extra power when required.

References Cited

UNITED STATES PATENTS

| | | | |
|---|---|---|---|
| 2,535,906 | 12/1950 | Dillon et al. ________ | 179—2.5 |
| 3,105,125 | 9/1963 | Kassig. | |

ROBERT L. GRIFFIN, Primary Examiner

J. A. BRODSKY, Assistant Examiner

U.S. Cl. X.R.

179—170